United States Patent Office 3,577,481
Patented May 4, 1971

3,577,481
PHOSPHORIC ACID ESTERS
Max Schuler, Arlesheim, Switzerland, assignor to Sandoz Ltd. (also known as Sandoz AG), Basel, Switzerland
No Drawing. Continuation-in-part of application Ser. No. 715,138, Mar. 22, 1968. This application Nov. 12, 1969, Ser. No. 876,102
Claims priority, application Switzerland, Apr. 3, 1967, 4,689/67
Int. A01n 9/36; C07f 9/08
U.S. Cl. 260—942      10 Claims

ABSTRACT OF THE DISCLOSURE

Compounds of the Formula I $$\begin{array}{c}R_1O\phantom{xx}O\phantom{xxxxx}X\phantom{x}O\phantom{xx}R_3\\ \phantom{xx}\diagdown\uparrow\phantom{xx}\phantom{xxx}|\phantom{x}\|\phantom{x}\diagup\\ \phantom{xxx}P-O-C=C-C-N\\ \diagup\phantom{xxxxxxxxx}|\phantom{xxxxxxxx}\diagdown\\ R_2O\phantom{xxxxx}CH_3\phantom{xxxxx}CH_2COOR_4\end{array}\quad\text{(I)}$$

wherein each of $R_1$ and $R_2$ represents a methyl or ethyl radical,
each of $R_3$ and $R_4$ represents an alkyl radical with 1 to 4 carbon atoms, and
X represents a hydrogen or halogen atom, are exemplified and their use as pest combating agents in plant cultivation is given; specific pesticidal effects tested are those against *Bruchidius obtectus*, *Ephestia* (*Anagesta*) *kuehniella*, *Aphis fabae* and *Tetranychus telarius* as well as toxicity comparison studies on rats.

SUMMARY OF THE INVENTION

This application is a continuation-in-part of application Ser. No. 715,138 filed Mar. 22, 1968, now abandoned.

The present invention provides a phosphoric acid ester of the Formula I $$\begin{array}{c}R_1O\phantom{xx}O\phantom{xxxxx}X\phantom{x}O\phantom{xx}R_3\\ \phantom{xx}\diagdown\uparrow\phantom{xx}\phantom{xxx}|\phantom{x}\|\phantom{x}\diagup\\ \phantom{xxx}P-O-C=C-C-N\\ \diagup\phantom{xxxxxxxxx}|\phantom{xxxxxxxx}\diagdown\\ R_2O\phantom{xxxxx}CH_3\phantom{xxxxx}CH_2COOR_4\end{array}\quad\text{(I)}$$

wherein:

each of $R_1$ and $R_2$ represents a methyl or ethyl radical,
each of $R_3$ and $R_4$ represents an alkyl radical with 1 to 4 carbon atoms, and
X represents a hydrogen or halogen atom.

The compounds of Formula I are useful for combating pests, especially for combating insects and spider mites.

The phosphoric acid esters of the Formula I may be obtained, in a manner known per se, by reacting equimolecular amounts of a compound of the Formula II $$\begin{array}{c}X\phantom{xx}Y\phantom{x}O\phantom{xx}R_3\\ \diagdown\diagup\phantom{x}\|\phantom{x}\diagup\\ CH_3C\dot{O}C-\!\!-\!\!-C-N\\ \phantom{xxxxxxxxxxx}\diagdown\\ \phantom{xxxxxxxxxxx}CH_2COOR_4\end{array}\quad\text{(II)}$$

wherein:

Y represents a halogen atom, especially chlorine, and $R_3$, $R_4$ and X are as defined above, and trimethyl- or triethyl phosphite according to the principle of the Perkow reaction as shown in the following reaction scheme.

$$\begin{array}{c}\phantom{xxxxxxxxxxx}X\phantom{xx}Y\phantom{x}O\phantom{xx}R_3\\ \phantom{xxxxxxxxxxx}\diagdown\diagup\phantom{x}\|\phantom{x}\diagup\\ (Alk\text{-}O)_3P + O=C-C\!-\!-\!-C-N\phantom{xxxx}\longrightarrow\\ \phantom{xxxxxxxxxxxxxxx}|\phantom{xxxxxxxx}\diagdown\\ \phantom{xxxxxxxxxxxxxxx}CH_3\phantom{xxxxx}CH_2OOR_4\\[4pt]\phantom{xxxx}O\phantom{xxxxx}X\phantom{x}O\phantom{xx}R_3\\ \phantom{xxxx}\uparrow\phantom{xxxx}|\phantom{x}\|\phantom{x}\diagup\\ (Alk\text{-}O)_2P-O-C=C-C-N\phantom{xxxx}+Alk\text{-}Y\\ \phantom{xxxxxxxxxxx}|\phantom{xxxxxxx}\diagdown\\ \phantom{xxxxxxxxxxx}CH_3\phantom{xxxxx}CH_2COOR_4\end{array}$$

wherein:

$R_3$, $R_4$, X and Y are as defined above, and
Alk is ethyl or methyl.

Those of the phosphoric acid esters of the Formula I, wherein X represents H, may be obtained by the reaction of a phosphoric acid chloride of the Formula III $$\begin{array}{c}R_1O\phantom{xx}O\\ \phantom{xx}\diagdown\uparrow\\ \phantom{xxx}P-Cl\\ \diagup\\ R_2O\end{array}\quad\text{(III)}$$

wherein $R_1$ and $R_2$ are as defined above, with the enol form of a substituted acetoacetic acid amide of the Formula IV $$\begin{array}{c}\phantom{xxxxxxxx}O\phantom{xx}R_3\\ \phantom{xxxxxxxx}\|\phantom{x}\diagup\\ M-O-C=CH-C-N\\ \phantom{xxxxxxx}|\phantom{xxxxxxx}\diagdown\\ \phantom{xxxxxxx}CH_3\phantom{xxxxx}CH_2COOR_4\end{array}\quad\text{(IV)}$$

wherein:

M represents a salt forming atom or a salt forming group, and
$R_3$ and $R_4$ are as defined above;

this reaction is illustrated by the following scheme:

$$\begin{array}{c}R_1O\phantom{xx}O\phantom{xxxxxxxxxxxxx}O\phantom{xx}R_3\\ \phantom{xx}\diagdown\uparrow\phantom{xxxxxxxxxxxxxx}\|\phantom{x}\diagup\\ \phantom{xxx}P-\text{halogen} + M-O-C=CH-C-N\phantom{xxx}\longrightarrow\\ \diagup\phantom{xxxxxxxxxxxxxxxx}|\phantom{xxxxxxx}\diagdown\\ R_2O\phantom{xxxxxxxxxxxxx}CH_3\phantom{xxxxx}CH_2COOR_4\\[4pt] R_1O\phantom{xx}O\phantom{xxxxx}O\phantom{xx}R_3\\ \phantom{xx}\diagdown\uparrow\phantom{xxxxx}\|\phantom{x}\diagup\\ \phantom{xxx}P-O-C=CH-C-N\phantom{xxxx}+M\text{-halogen}\\ \diagup\phantom{xxxxxx}|\phantom{xxxxxxx}\diagdown\\ R_2O\phantom{xxxxx}CH_3\phantom{xxxxx}CH_2COOR_4\end{array}$$

wherein $R_1$, $R_2$, $R_3$, $R_4$ and M are as defined above.

The phosphoric acid esters of Formula I are obtained in the form of light oils which are fairly soluble in water; they can be purified in the usual way. However, they cannot be distilled in a high vacuum without decomposition. They are soluble in oils as well as organic solvents and can easily be brought into aqueous emulsion. As pointed out above, they are useful for combating pests, especially insects and spider mites, in plant protection.

The combating of pests with a phosphoric acid derivative of Formula I is suitably effected in such a way that a compound of Formula I is mixed with an emulsifier, e.g. a liquid polyglycol ether which has resulted from a high molecular weight alcohol, mercaptan or alkyl phenol by the addition of ethylene oxide; the resulting mixture is then emulsified in water and the emulsion is brought on to the surface to be treated by spraying. In this way it is possible to add to the mixture also one or more suitable organic solvents, for example mono- or polyalcohols, ketones, aromatic hydrocarbons, mineral oils, as solubilizers. However, in order to produce products suspendible in water it is possible to add one or more solid carriers, for example talc, kaolin, diatomaceous earth or bentonite. Before using them, the liquid or pulverulent product containing as active agent one or more compounds of the Formula I is emulsified or dispersed in water, it being suitable for the resulting dispersion to contain 0.001–0.2% of the said phosphoric acid derivative; on using the said product in the low volume spraying process (compare page 56 of Hubert Martin's "Insecticide and Fungicide Handbook," published by Blackwell Scientific Publications, Oxford, 1963) this quantity may be increased to 20%.

The phosphoric acid esters I may be worked up to form a dusting or strewing agent or a granulate without any addition of emulsifiers, but with one or more agriculturally acceptable carriers, e.g. talc, kaolin, diatomaceous earth, bentonite or pumice stone, or a mixture of such carriers, with the optional addition of one or more adhesives.

The pesticidal compositions are applied as a spray, dust, strewing agent or granulate to the locus to be protected from the pests (insects or spider mites), e.g. to growing crops, trees or bushes. Such application can be made directly to the locus during the period of pest infestation, or alternatively the application can be made in advance of an anticipated pest infestation to prevent such infestation. For example the compositions can be applied as foliar sprays or dusts, but can also be applied as sprays, dusts, granulates or strewing agents directed to the surface of the soil.

The following examples illustrate the invention.

(A) PRODUCTION OF THE PHOSPHORIC ACID ESTERS OF THE FORMULA I (a) According to the first above method of producing the compounds of the invention, 1 mol of trialkyl phosphite is added at 20° C. to 60° C. to 1 mol of the halogenated acetoacetic acid amide of the Formula II, dissolved in toluene or xylene, and subsequently stirring for 1 to 3 hours at 110 to 125° C. is effected. After the reaction is complete, the solvent and easily volatilized materials are distilled off first in the vacuum of a water pump and then at 0.01 to 1 mm. at a bath temperature up to 100° C. The required product of the Formula I is obtained in sufficiently pure form and in almost quantitative yield.

(b) According to the second method of producing the compounds of the invention, 1 g. atom of sodium metal is pulverized in anhydrous toluene and then 1 mol of acetoacetic acid amide of the Formula IV (M=H) is added dropwise at 40–60° C. After the reaction is complete, cooling to 0° C. is effected and 1 mol of chloride of the Formula III is added dropwise during 10–20 minutes, care being taken by appropriate cooling to ensure that the temperature does not exceed 20–30° C. Stirring is subsequently effected for 15 to 30 minutes longer at 30–50° C. After cooling to 10–20° C., shaking out with a little water is effected, the separated toluene solution is dried with sodium sulphate and the solvent is distilled off on a water bath in the vacuum of a water pump. The crude phosphoric acid ester of the Formula I (X=H) is obtained with a yield of 70 to 95% and is present in sufficiently pure form.

In the following Table A there are mentioned a number of compounds of the Formula I (hereinafter called active agents) which are produced and purified according to the above mentioned methods and of which the substituents $R_1$, $R_2$, $R_3$, $R_4$ and X have the meaning stated in the table. Analysis data are given for some of these compounds.

TABLE A

| | | | | | | | | | | | | | | |
|---|---|---|---|---|---|---|---|---|---|---|---|---|---|---|
| | | | | | \multicolumn{5}{c}{Analyses figures in percent} | | | | | | |
| | | | | | Calculated | | | | | Found | | | | |
| | $R_1$ | $R_2$ | $R_3$ | $R_4$ | X | C | H | Cl | N | P | C | H | Cl | N | P |

| Example number | $R_1$ | $R_2$ | $R_3$ | $R_4$ | X | C | H | Cl | N | P | C | H | Cl | N | P |
|---|---|---|---|---|---|---|---|---|---|---|---|---|---|---|---|
| 1 | $CH_3$ | $CH_3$ | $CH_3$ | $CH_3$ | H | 40.7 | 6.1 | | 4.8 | 10.5 | 41.1 | 6.2 | | 4.8 | 9.9 |
| 2 | Same | Same | Same | Same | Cl | 36.4 | 5.1 | 10.8 | 4.2 | 9.4 | 36.7 | 5.0 | 10.9 | 4.0 | 9.1 |
| 3 | $C_2H_5$ | $C_2H_5$ | do | do | H | 44.6 | 6.8 | | 4.3 | 9.6 | 44.2 | 6.7 | | 4.4 | 9.2 |
| 4 | do | do | do | do | Cl | 40.2 | 5.9 | 9.9 | 3.9 | 8.7 | 40.5 | 5.8 | 9.7 | 4.0 | 8.5 |
| 5 | $CH_3$ | $CH_3$ | do | $C_2H_5$ | H | 42.7 | 6.5 | | 4.5 | 10.0 | 42.4 | 6.3 | | 4.2 | 9.9 |
| 6 | Same | Same | do | Same | Cl | 38.4 | 5.5 | 10.3 | 4.1 | 9.0 | 38.1 | 5.5 | 10.1 | 4.0 | 9.2 |
| 7 | $C_2H_5$ | $C_2H_5$ | do | do | H | 46.3 | 7.1 | | 4.2 | 9.2 | 46.0 | 7.4 | | 4.2 | 9.2 |
| 8 | Same | Same | do | do | Cl | 42.0 | 6.2 | 9.5 | 3.8 | 8.4 | 41.7 | 6.0 | 9.9 | 4.0 | 8.5 |
| 9 | $CH_3$ | $CH_3$ | do | $n-C_3H_7$ | H | 44.6 | 6.8 | | 4.3 | 9.6 | 44.3 | 6.7 | | 4.5 | 9.8 |
| 10 | Same | Same | do | Same | Cl | 40.2 | 5.9 | 9.9 | 3.9 | 8.7 | 40.4 | 5.8 | 10.0 | 3.7 | 8.6 |
| 11 | $C_2H_5$ | $C_2H_5$ | do | do | H | 47.9 | 7.4 | | 4.0 | 8.8 | 48.0 | 7.4 | | 4.3 | 8.6 |
| 12 | Same | Same | do | do | Cl | 43.5 | 6.5 | 9.2 | 3.6 | 8.0 | 43.4 | 6.1 | 9.4 | 3.3 | 7.8 |
| 13 | $CH_3$ | $CH_3$ | do | $iso-C_3H_7$ | H | 44.6 | 6.8 | | 4.3 | 9.6 | 44.5 | 6.8 | | 4.2 | 9.5 |
| 14 | Same | Same | do | Same | Cl | 40.2 | 5.9 | 9.9 | 3.9 | 8.7 | 40.6 | 5.6 | 9.5 | 3.9 | 8.4 |
| 15 | $C_2H_5$ | $C_2H_5$ | do | do | H | 47.9 | 7.4 | | 4.0 | 8.8 | 47.9 | 7.3 | | 4.0 | 8.6 |
| 16 | Same | Same | do | do | Cl | 43.5 | 6.5 | 9.2 | 3.6 | 8.0 | 43.4 | 6.4 | 9.0 | 3.5 | 7.7 |
| 17 | $CH_3$ | $CH_3$ | do | $n-C_4H_9$ | H | 46.3 | 7.1 | | 4.2 | 9.2 | 46.6 | 7.0 | | 4.2 | 8.8 |
| 18 | Same | Same | do | Same | Cl | 41.9 | 6.2 | 9.6 | 3.8 | 8.3 | 41.5 | 6.3 | 9.9 | 3.6 | 7.9 |
| 19 | $C_2H_5$ | $C_2H_5$ | do | do | H | 49.3 | 7.7 | | 3.8 | 8.5 | 49.6 | 7.6 | | 3.7 | 8.6 |
| 20 | Same | Same | do | do | Cl | 45.1 | 6.8 | 8.9 | 3.5 | 7.8 | 45.2 | 6.7 | 9.0 | 3.5 | 7.5 |
| 21 | $CH_3$ | $CH_3$ | do | $iso-C_4H_9$ | H | 46.3 | 7.1 | | 4.2 | 9.2 | 46.6 | 7.3 | | 4.0 | 8.9 |
| 22 | $C_2H_5$ | $C_2H_5$ | do | Same | H | 49.3 | 7.7 | | 3.8 | 8.5 | 49.2 | 7.7 | | 3.6 | 8.0 |
| 23 | $CH_3$ | $CH_3$ | do | $sec.=C_4H_9$ | H | 46.3 | 7.1 | | 4.2 | 9.2 | 46.3 | 7.0 | | 4.1 | 9.4 |
| 24 | $C_2H_5$ | $C_2H_5$ | do | Same | H | 49.3 | 7.7 | | 3.8 | 8.5 | 49.4 | 7.8 | | 3.8 | 8.3 |
| 25 | $CH_3$ | $CH_3$ | do | $tert.=C_4H_9$ | H | 46.3 | 7.1 | | 4.2 | 9.2 | 46.4 | 7.1 | | 4.5 | 8.9 |
| 26 | $C_2H_5$ | $C_2H_5$ | do | Same | H | 49.3 | 7.7 | | 3.8 | 8.5 | 49.6 | 8.0 | | 3.7 | 8.1 |
| 27 | $CH_3$ | $CH_3$ | $C_2H_5$ | $CH_3$ | H | 42.7 | 6.5 | | 4.5 | 10.0 | 42.8 | 6.4 | | 4.5 | 9.6 |
| 28 | $C_2H_5$ | $C_2H_5$ | Same | Same | H | 46.3 | 7.1 | | 4.2 | 9.2 | 46.3 | 7.0 | | 4.0 | 9.4 |
| 29 | $CH_3$ | $CH_3$ | do | $C_2H_5$ | H | 44.6 | 6.8 | | 4.3 | 9.6 | 44.5 | 6.5 | | 4.6 | 9.2 |
| 30 | $C_2H_5$ | $C_2H_5$ | do | Same | H | 47.9 | 7.4 | | 4.0 | 8.8 | 47.8 | 7.4 | | 3.8 | 8.7 |
| 31 | $CH_3$ | $CH_3$ | do | do | Cl | 40.2 | 5.9 | 9.9 | 3.9 | 8.7 | 40.3 | 6.0 | 9.6 | 3.8 | 8.4 |
| 32 | $C_2H_5$ | $C_2H_5$ | do | do | Cl | 43.5 | 6.5 | 9.2 | 3.6 | 8.0 | 43.7 | 6.4 | 9.6 | 3.4 | 7.8 |
| 33 | $CH_3$ | $CH_3$ | do | $n-C_3H_7$ | H | 46.3 | 7.1 | | 4.2 | 9.2 | 46.6 | 7.0 | | 4.6 | 9.0 |
| 34 | $C_2H_5$ | $C_2H_5$ | do | Same | H | 49.3 | 7.7 | | 3.8 | 8.5 | 49.4 | 7.5 | | 3.9 | 8.3 |
| 35 | $CH_3$ | $CH_3$ | do | $iso-C_3H_7$ | H | 46.3 | 7.1 | | 4.2 | 9.2 | 46.4 | 7.2 | | 4.2 | 8.8 |
| 36 | $C_2H_5$ | $C_2H_5$ | do | Same | H | 49.3 | 7.7 | | 3.8 | 8.5 | 49.2 | 7.7 | | 3.7 | 8.2 |
| 37 | $CH_3$ | $CH_3$ | do | do | Cl | 41.9 | 6.2 | 9.6 | 3.8 | 8.3 | 42.1 | 6.4 | 9.2 | 3.6 | 8.0 |
| 38 | $C_2H_5$ | $C_2H_5$ | do | do | Cl | 45.1 | 6.8 | 8.9 | 3.5 | 7.8 | 44.7 | 6.6 | 9.1 | 3.4 | 7.5 |
| 39 | $CH_3$ | $CH_3$ | $n-C_3H_7$ | $CH_3$ | H | | | | | | | | | | |
| 40 | Same | Same | Same | Same | Cl | | | | | | | | | | |
| 41 | $C_2H_5$ | $C_2H_5$ | do | do | H | | | | | | | | | | |
| 42 | Same | Same | do | do | Cl | | | | | | | | | | |
| 43 | $CH_3$ | $CH_3$ | do | $C_2H_5$ | H | | | | | | | | | | |
| 44 | Same | Same | do | Same | Cl | | | | | | | | | | |
| 45 | $C_2H_5$ | $C_2H_5$ | do | do | H | | | | | | | | | | |
| 46 | Same | Same | do | do | Cl | | | | | | | | | | |
| 47 | $CH_3$ | $CH_3$ | $iso-C_3H_7$ | do | H | | | | | | | | | | |
| 48 | Same | Same | Same | do | Cl | | | | | | | | | | |
| 49 | $C_2H_5$ | $C_2H_5$ | do | do | H | | | | | | | | | | |
| 50 | Same | Same | do | do | Cl | | | | | | | | | | |
| 51 | $CH_3$ | $CH_3$ | do | $C_2H_5$ | H | | | | | | | | | | |
| 52 | Same | Same | do | Same | Cl | | | | | | | | | | |
| 53 | $C_2H_5$ | $C_2H_5$ | do | do | H | | | | | | | | | | |
| 54 | Same | Same | do | do | Cl | | | | | | | | | | |
| 55 | $CH_3$ | $CH_3$ | $n-C_3H_7$ | $iso-C_3H_7$ | H | | | | | | | | | | |
| 56 | $C_2H_5$ | $C_2H_5$ | Same | Same | H | | | | | | | | | | |
| 57 | $CH_3$ | $CH_3$ | $iso-C_3H_7$ | $n-C_3H_7$ | H | | | | | | | | | | |
| 58 | $C_2H_5$ | $C_2H_5$ | Same | Same | H | | | | | | | | | | |

(B) PRODUCTION OF PREPARATIONS FROM EACH OF THE COMPOUNDS MENTIONED IN TABLE A (1) 50 parts by weight of each active agent are mixed with 50 parts by weight of isooctylphenyloctaglycol ether and in each case a clear solution results which may be easily stirred with water to form a finely dispersed emulsion.

(2) 20 parts by weight of each active agent are mixed with 30 parts by weight of isooctylphenyloctaglycol ether and 50 parts by weight of a petroleum fraction of a boiling range 210–280° C., specific gravity (20° C.) 0.92 and in each case a clear solution results which is easily emulsifiable in water.

(3) 25 parts by weight of each active agent are mixed with 25 parts by weight of isooctylphenyldecaglycol ether and 50 parts by weight of xylene; in each case a clear solution results which is easily emulsifiable in water.

(4) By mixing 40 parts by weight of each active agent, 25 parts by weight of diisohexyl/heptylphenylhexaglycol ether and 35 parts by weight of acetone; in each case a clear solution results which can easily be stirred with water to form a finely dispersed emulsion.

(5) 30 parts by weight of each active agent, 25 parts by weight of laurylhexaglycol ether and 45 parts by weight of isopropyl alcohol are stirred; in each case a clear homogeneous solution is formed which may be emulsified easily with water.

(C) TESTING OF THE PREPARATIONS PRODUCED ACCORDING TO (B)

Spraying agents according to Example B(1) containing 50% of active agent are used for the tests. By emulsifying 4 g. and 1 g. respectively thereof in 1 litre of water liquors are produced containing 0.2% and 0.05% respectively of each active agent.

(a) Contact effect of dry layer

Insect: Bruchidius obtectus, imagines.—About 0.1–0.2 ml. of liquor per dish are sprayed into 7 cm. diameter Petri dishes by means of a spraying nozzle. The liquor concentration amounts to 0.05% of active agent. After drying the layer for about 4 hours, 10 Bruchidius imagines are put into each dish and the later is covered with a cover of fine mesh brass wire grating. The animals are kept at room temperature without feed for 48 hours and the dead ones are then counted out. The mortality figures are stated as a percentage (compare Table C(1)).

(b) Contact effect by direct spraying

Insect: Ephestia (Anagesta) kuehniella, caterpillars.— On the eve of treatment 10 caterpillars each of 10–12 mm. in length are counted into 7 cm. diameter Petri dishes and kept without feed up to the treatment. They are then directly sprayed in the open dish by means of a spraying nozzle in such a way that the liquor per dish amounts to 0.1–0.2 ml.; the liquor concentrations amount to 0.2% and 0.05% of active agent. The dishes are covered with a lid of fine mesh brass wire grating. After drying the layer, a wafer is given as feed and renewed as required. After 5 days the dead animals are counted out. The mortality is stated as a percentage (compare Table C(1)).

(c) Contact effect against Aphis fabae (black bean aphid)

Black beans of about 10 cm. in length are infected 2 days before treatment in a breed cage with 800–1200 aphids per test plant (mixed population).

The infected plants are cut and immediately immersed for 3 seconds in a moderately agitated liquor containing 0.05% of active agent. The branch is then placed into a culture flask (diameter 5 cm.) and the liquor is allowed to drip off. After the liquor has dried, the plant is brought into an almost horizontal position above a glass plate 20 x 20 cm. After 2 days, the amount of the exuded honeydew is noted (0: no exudation, 5: very strong exudation). These notation indices are converted into an effect percentage, taking into account the untreated controls. The effect is stated as a percentage. The results are listed in Table C(1), the following abbreviations being used:

Br—Effect on Bruchidius after 2 days,
Ep—Effect on Ephestia after 5 days,
Aph—Effect on Aphis after 2 days.

TABLE C(1)

| Example No. | Active agent No. | Br (0.05%) | Ep 0.2% | Ep 0.05% | Aph (0.05%) |
|---|---|---|---|---|---|
| C.1 | A.1 | 90 | 100 | 100 | 100 |
| C.2 | A.3 | 90 | 100 | 100 | 95 |
| C.3 | A.5 | 90 | 100 | 100 | 100 |
| C.4 | A.9 | 100 | 100 | 100 | 100 |
| C.5 | A.11 | 80 | 100 | 90 | 100 |
| C.6 | A.10 | 80 | 100 | 100 | 95 |
| C.7 | A.12 | 100 | 100 | 90 | 100 |
| C.8 | A.13 | 80 | 100 | 100 | 100 |

For comparison purposes a spraying agent is tested containing 50% of the known pesticide A.59

(A.59) 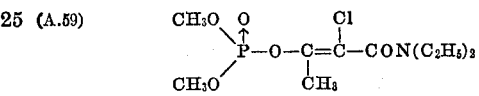

the same test set up and the same conditions being used as for testing the compounds of Formula I.

| | Insecticidal effect (percent mortality) | | | |
|---|---|---|---|---|
| | Br (0.05%) | Ep 0.2% | Ep 0.05% | Aph (0.05%) |
| A.59 | 90–100 | 20–100 | 40–100 | 90–100 |

The phosphoric acid esters of the Formula I have at least an equally good insecticidal effect as the comparative active agent.

(d) Acaricidal contact effect on Tetranychus telarius

A spraying agent according to Example B3 is used containing 25% of active agent. By stirring 2 g. of each agent in 1 litre of water liquors are obtained containing 0.05% of active agent.

One day before treatment leaf disks of 2 cm. diameter are cut from bean leaves by means of a cork borer, each leaf containing 20–30 mites (Larvae III and adults). Each of the disks is kept in a Petri dish until treatment, they are then immersed in a moderately agitated liquor during 3 seconds and each disk is replaced in its Petri dish into each of which there had been placed a filter paper. Subsequently the filter paper is freshly moistened and the dish lid applied at an oblique angle so that slight aeration does not cause rapid drying. After 48 hours at room temperature, the live and dead mites are counted out under a binocular magnifying glass (tenfold magnification). The mortality is stated as a percentage (compare the following Table C(2)).

TABLE C (2)

| Example number | Active agent number | Acaricidal effect, 0.05% |
|---|---|---|
| C.1 | A.1 | 100 |
| C.2 | A.3 | 100 |
| C.3 | A.5 | 100 |
| C.8 | A.13 | 95 |
| C.9 | A.2 | 100 |
| C.10 | A.4 | 100 |
| C.11 | A.6 | 100 |
| C.12 | A.29 | 100 |
| C.13 | A.31 | 100 |
| C.14 | A.59 | 40–70 |

Preparation C.14 containing the known pesticide A.59 is tested for comparison purposes and shows an appreciably weaker effect than the phosphoric acid esters of the Formula I which show an unexpectedly good acaricidal effect against spider mites.

(D) Toxicity comparisons

| Active agent No.: | Oral $LD_{50}$ on rats, mg./kg. |
|---|---|
| A.1 | 23 |
| A.5 | 38 |
| A.9 | 70 |
| A.59 (known) [1] | 15 |

[1] World Review of Pest Control, vol. 5, No. 3, page 145 (1966).

As may be seen from the above compilation, the active agents according to the invention compared with the comparative substance show a surprisingly lower toxicity towards warm-blooded animals and they therefore have an unexpected advantage for their practical use in plant protection.

For normal application, the pesticidal compositions will contain 0.005 to 0.2% of a compound of Formula I. However, for the so-called "low volume application" (e.g. from aeroplanes) the compositions would normally contain a higher percentage of the active ingredient. It will be appreciated that, with pesticides, it is not possible to give, for example, an amount of the pesticide per unit area of locus to be treated.

Although the present invention is described herein with particular reference to specific details, it is not intended that such details shall be regarded as limitations upon the scope of the invention except insofar as included in the accompanying claims.

I claim:
1. A phosphoric acid ester of the Formula I

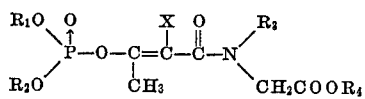

(I)

wherein
each of $R_1$ and $R_2$ represents a methyl or ethyl radical,
each of $R_3$ and $R_4$ represents an alkyl radical with 1 to 4 carbon atoms inclusive, and
X represents a hydrogen or a chlorine atom.

2. An ester according to claim 1, in which each of $R_1$, $R_2$ and $R_3$ is $CH_3$.
3. An ester according to claim 1, in which each of $R_1$ and $R_2$ is $C_2H_5$, and $R_3$ is $CH_3$.
4. An ester according to claim 1, in which each of $R_1$, $R_2$ and $R_3$ is $C_2H_5$.
5. An ester according to claim 1, in which each of $R_1$ and $R_2$ is $CH_3$, and $R_3$ is $C_2H_5$.
6. An ester according to claim 1, in which each of $R_1$ and $R_2$ is $CH_3$, and $R_3$ is $n-C_3H_7$ or $iso-C_3H_7$.
7. An ester according to claim 1, in which each of $R_1$ and $R_2$ is $C_2H_5$, and $R_3$ is $n-C_3H_7$ or $iso-C_3H_7$.
8. An ester according to claim 1, in which each of $R_1$, $R_2$, $R_3$ and $R_4$ is $CH_3$ and X is H.
9. An ester according to claim 1, in which each of $R_1$, $R_2$ and $R_3$ is $CH_3$, $R_4$ is $C_2H_5$ and X is H.
10. An ester according to claim 1, in which each of $R_1$, $R_2$ and $R_3$ is $CH_3$, $R_4$ is $n-C_3H_7$ and X is H.

References Cited

UNITED STATES PATENTS

| 3,022,215 | 2/1962 | Schuler | 260—943X |
| 3,055,798 | 9/1962 | Beriger | 260—943X |
| 3,431,325 | 3/1969 | Greenbaum | 260—942X |

FOREIGN PATENTS

| 921,121 | 3/1963 | Great Britain | 260—942 |

CHARLES B. PARKER, Primary Examiner
R. L. RAYMOND, Assistant Examiner

U.S. Cl. X.R.
260—969, 974; 424—211